Nov. 17, 1970    J. R. LANKARD ET AL    3,541,470
DYE LASER

Filed March 20, 1967    4 Sheets-Sheet 1

INVENTORS
JOHN R. LANKARD
PETER P. SOROKIN

BY *George Baran*
ATTORNEY

United States Patent Office 3,541,470
Patented Nov. 17, 1970

3,541,470
DYE LASER

John R. Lankard, Mahopac, and Peter P. Sorokin, White Plains, N.Y., assignors to International Business Machines Corporation, Armonk, N.Y., a corporation of New York
Filed Mar. 20, 1967, Ser. No. 624,336
Int. Cl. C09k 1/00; H01s 3/00
U.S. Cl. 331—94.5
9 Claims

ABSTRACT OF THE DISCLOSURE

A class of dyes known as the xanthene class has been made to lase. Moreover, an inexpensive, low inductance high energy flashlamp, whose output pulses have short risetimes, is employed to pump such xanthene dyes wherein such flashlamp is compatible with the xanthene dyes, such compatibility serving to obtain relatively high energy laser outputs with relatively low energy pumping lamps.

CROSS-REFERENCES TO RELATED APPLICATIONS

This invention is an extension of the teaching set forth in the invention entitled "Optically Pumped Organic Lasers," Ser. No. 594,956, filed Sept. 30, 1966, in the name of Peter P. Sorokin. Such parent case taught the use of organic dyes and photosensitizing dyes as active media that were made to lase by being pumped with the output of a ruby laser. However, as was noted in such parent application, it was deemed unnecessary to use only the output of a ruby laser for pumping such organic dyes and photosensitizing dyes. Incoherent light could provide the necessary pumping, provided the light was sufficiently intense and had a very short risetime. In such parent application the characteristics of such a light source was set out, but no specific lamp was shown or described.

The present invention sets out a lamp structure that is powerful enough to actuate the organic materials of the parent case and also has a risetime that is less than a few tenths of a microsecond. Moreover, the manner in which this lamp is disposed with respect to a class of dyes known as xanthene permits one to pump such dyes very efficiently with a lamp that is inexpensive to manufacture and which has an energy output under 100 joules.

Consequently, it is an object of this invention to provide a new class of lasing dyes.

A further object is to employ xanthene dyes as a lasing medium.

Yet another object is to provide an inexpensive lamp that is particularly compatible for pumping such xanthene dyes.

The foregoing and other objects, features and advantages of the invention will be apparent from the following more particular description of preferred embodiments of the invention, as illustrated in the accompanying drawings.

SUMMARY OF THE INVENTION

Figure 1:
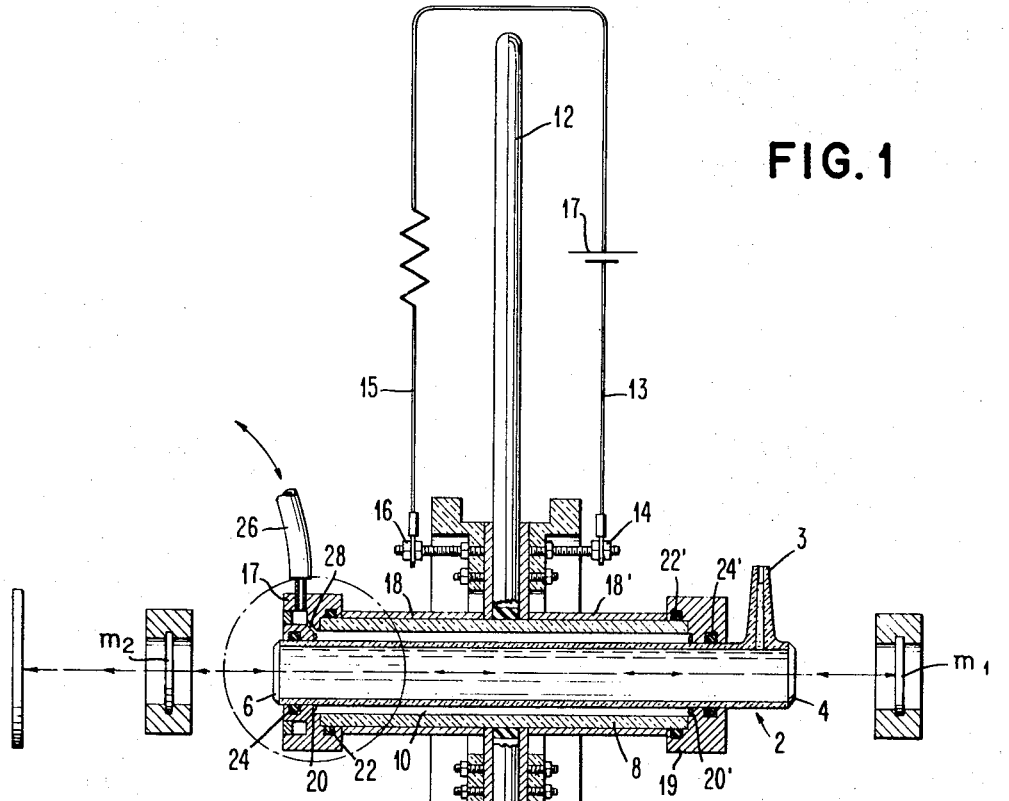
FIG. 1 is a cross section of the novel lamp surrounding a glass tube in which a dye is housed.
Figure 1A:
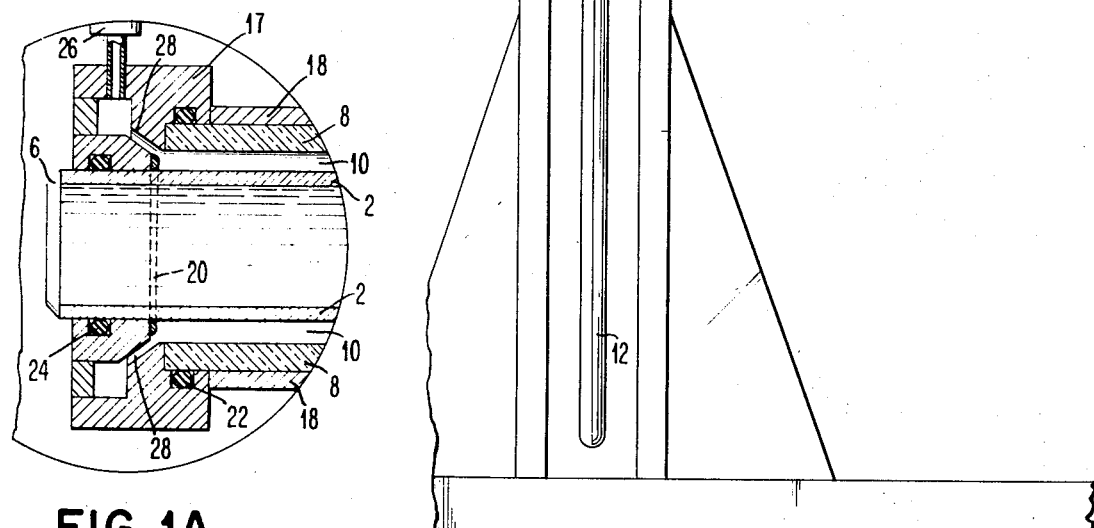
FIG. 1a is an enlarged view of the dotted circled area.

In FIG. 1 is shown a quartz cylinder 2 having a wall thickness of about 1.0 mm. Windows 4 and 6 close the ends of the ten centimeter long quartz cylinder 2 and the dye that is to lase is poured into the cylinder 2 through the stem 3. Mirrors $m_1$ and $m_2$ complete the laser cavity wherein one of the mirrors is totally reflective and the other $m_2$ is partially transmissive. A second quartz cylinder 8, shorter than cylinder 2 and having a wall thickness of about 3 mm., is coaxially disposed about cylinder 2. An annular region 10 of about 1 mm. thickness lies between the two cylinders 2 and 8. Centrally and coaxially located about the outer quartz cylinder 8 is a 0.5 $\mu$fd. low inductance disc capacitor 12, the latter having terminals 14 and 16 to which are applied the leads 13 and 15 of a conventional high voltage power supply 17 for charging such capacitor 12.

Copper flanges 18 and 18' connect terminals 14 and 16 to respective tungsten ring electrodes 20 and 20' via flanges 17 and 19. O-ring 22, 24 and 22' and 24' are used to hold quartz cylinders 2 and 8 and also to seal off the discharge region 10. The region 10 between cylinders 2 and 8 is filled with an appropriate gas mixture at a suitable pressure, typically, 400 mm. of pressure (300 mm. of air and 100 mm. of argon). Any gas pressure will do that maintains the region 10 above discharge threshold. A pipe 26 connects a vacucm pump (not shown) to annular region 10 through channels 28 cut in flange 17. Once capacitor 12 has been charged to an appropriate value, for example, 14,000 volts through terminals 14 and 16 from a suitable D.C. source, the vacuum pump is made to draw out gas from the annular region 10 via pipe 26 and channels 28. When the gas pressure is reduced to about 60 mm. of pressure, a pulsed discharge takes place in the annular region 10 between cylinders 2 and 8, providing pumping energy to the dye within cylinder 2

Figure 4:
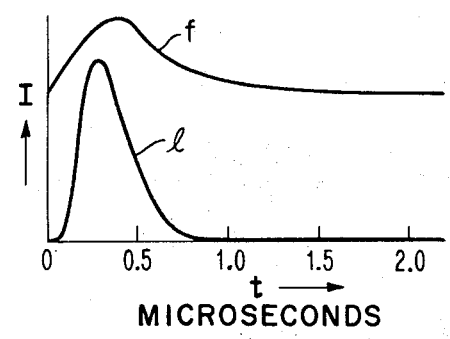
FIG. 4 shows two plots of intensity versus time, one for the lamp output and the other for the laser output.

As is seen in FIG. 4 of the drawings, the output curve $f$ of the flashlamp has a base width of about 0.9 $\mu$sec. and its peak intensity is reached in less than 0.4 $\mu$sec. It is seen that the laser output curve $l$ has a base width of about 0.7 $\mu$sec., and that lasing starts to decrease before the pump light attains its maximum. It is the high energy, sharp risetime of the pumping light source that is desired for lasing, and FIG. 4 confirms the fact that the described lamp achieves these two characteristics.

Below is a list of xanthene dyes, including the solvents for the dyes, the molar concentration of the dyes in solution, the threshold of electrical input energy and output energies, as well as color of the laser beams.

| Dye | Solvent | Molar concentration employed | Threshold [b] electrical input energy | Output energy,[c] millijoules | Color and wavelength of Laser beam |
|---|---|---|---|---|---|
| Acridine red | Ethyl alcohol | ~10⁻⁴ | 16J (8,000 v.) | ~10 | Orange (6,015 A.). |
| Rhodamine 6G | Ethyl alcohol or water, heavy water (D₂O) | ~10⁻⁴ | 12J (7,000 v.) | ~70 | Yellow (5,850 A.). |
| Fluorescein[a] | Water or (D₂O) | ~10⁻⁴ | 36J (12,000 v.) | (e) | Green (5,500 A.). |
| ....do.[a] | Ethyl alcohol | ~10⁻⁴ | 30J (11,000 v.) | ~1 | Do. |
| Rhodamine B | do | ~10⁻⁴ | 12J (7,000 v.) | 80 | Red-orange. |

[a] Fluorescein di-anion (sodium fluorescein).
[b] Measured using broad band external mirrors with R~0.95. Capacitance of energy storage bank, C=0.5µ fd.
[c] Measured at 50 joules electrical input. External mirrors roughly selected for optimum output coupling in each case.
[d] Center of stimulated emission band. Bands are typically 100 A. wide.
[e] Not measured.

It is seen that a dye can be pumped and made to lase with as little as twelve joules. The highest threshold in the list is still a relatively small amount of pumping energy (36J) for achieving lasing.

Figure 2:
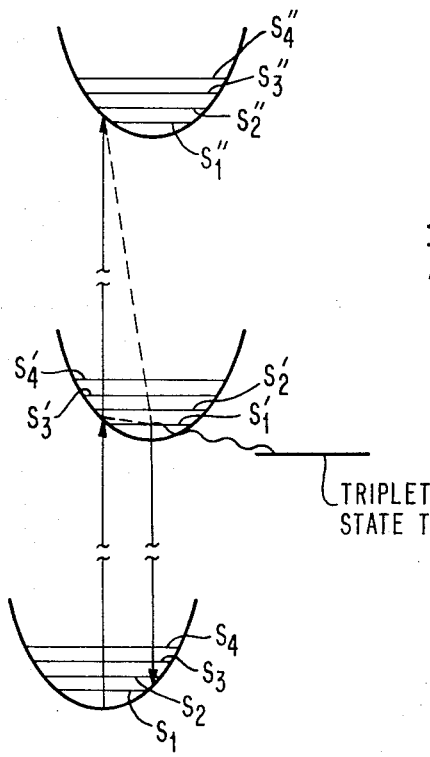
FIGS. 2 and 7 are energy level diagrams useful in the understanding of the operation of the present invention.
Figure 3:
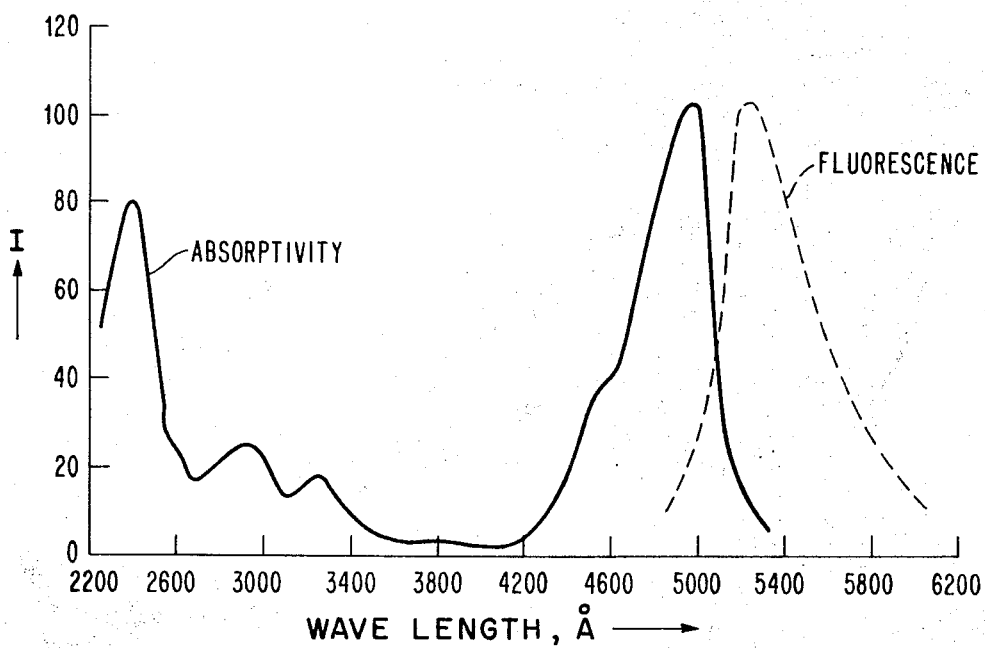
FIG. 3 is a plot of an absorption curve and a fluorescence curve for the dye fluorescein.

Attention is now directed to FIG. 2 as an aid in understanding the lasing action of the xanthene dyes. Most of the pumping light originating from region 10 (see FIG. 1) is absorbed in the dye, causing transitions of the dye molecules from the lowest vibrational-rotational band $S_1$ of the ground electronic state to various vibrational-rotational bands $S'_i, S''_i, S'''_i \ldots S^n_i$, where $i=1, 2, 3 \ldots$, of higher electronic states. Subsequent non-radiative transitions then carry all molecules to the lowest vibrational-rotational band $S'_1$ of the first excited electronic state. Stimulated emission occurs in a transition from the band $S'_1$ to excited vibrational levels of the ground electronic state. The well-known Franck-Condon shift is helpful in that it shifts the output frequency from the region of maximum absorption, which is (for fluorescein) about 4940 A. as seen in FIG. 3, to 5270 A. so as to provide a favorable gain versus loss condition.

In the practice of this invention, excited singlet to triplet transitions are undesirable because such transitions deplete the population of the first vibrational level of the first excited singlet state $S'_1$ and, consequently, reduce the population inversion between this state and the various excited vibrational levels of the ground singlet state.

More significantly, the molecules which have accumulated in the triplet state T tend to produce absorption which reduces the gain associated with a large population in the vibrational-rotational band $S'_1$. The necessity for rapid pump excitation arises because a certain number of excited molecules will accumulate in the lowest triplet state T (see FIG. 7), which is a metastable level, as a result of non-radiative decay from the lowest excited state $S'_1$ during the time required for the pumping flux to reach its peak. Transitions are, in general, strongly allowed from the lowest triplet state T to higher triplet states $T', T'' \ldots T^n$, and these may occur in the same spectral region occupied by the singlet-singlet fluorescence peak. Thus the triplet state population density $n_T$ accumulated by the time the first excited singlet state population density reaches the value $n_1$ (the inverted population per unit volume required at threshold) may, in fact, produce an overall loss, so that no laser action is possible. Clearly knowledge of the relative strengths of triplet-triplet and singlet-singlet transitions is very important in this connection. Although triplet-triplet spectra have been determined so far for only a relatively few organic molecules, excellent studies of this sort have been performed by Zanker and Miethke for a number of dye molecules (see FIGS. 5 and 6). We will use their results as guidelines in what follows.

Figure 5:
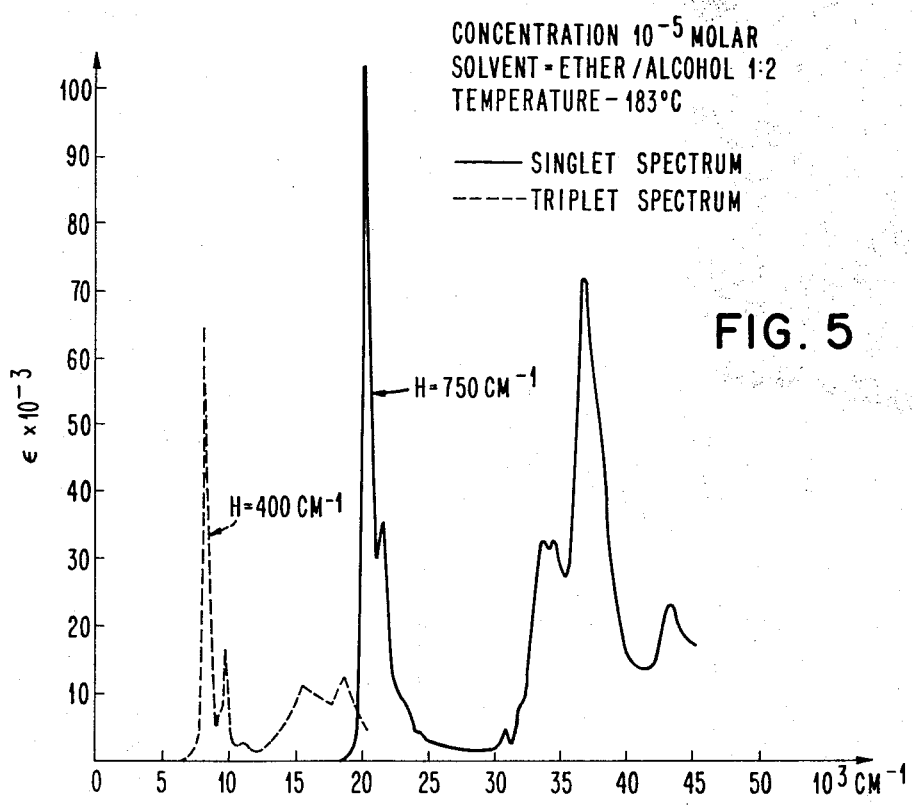
FIGS. 5 and 6 are absorptivity versus frequency plots for two different dyes.
Figure 6:
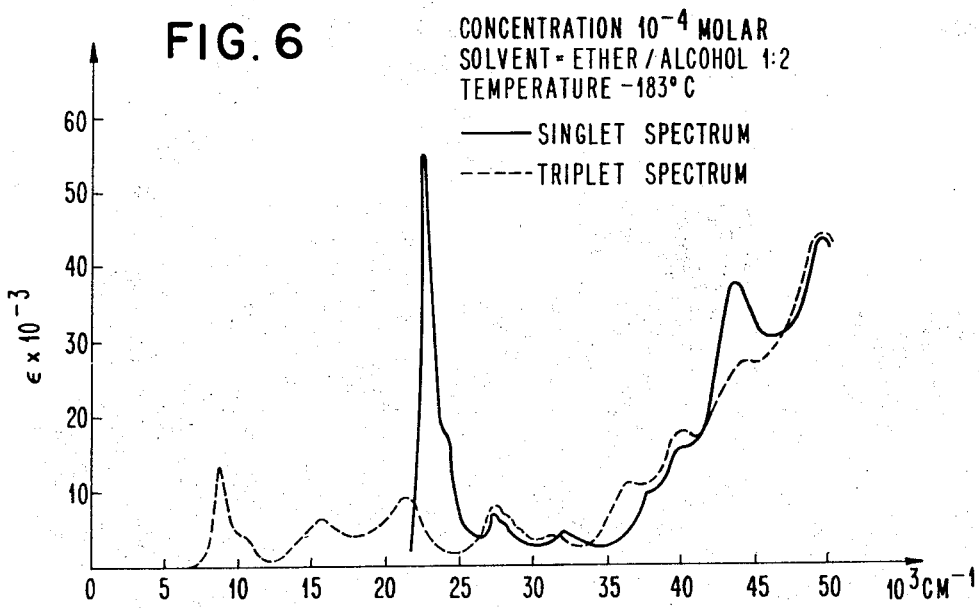
Figure 7:
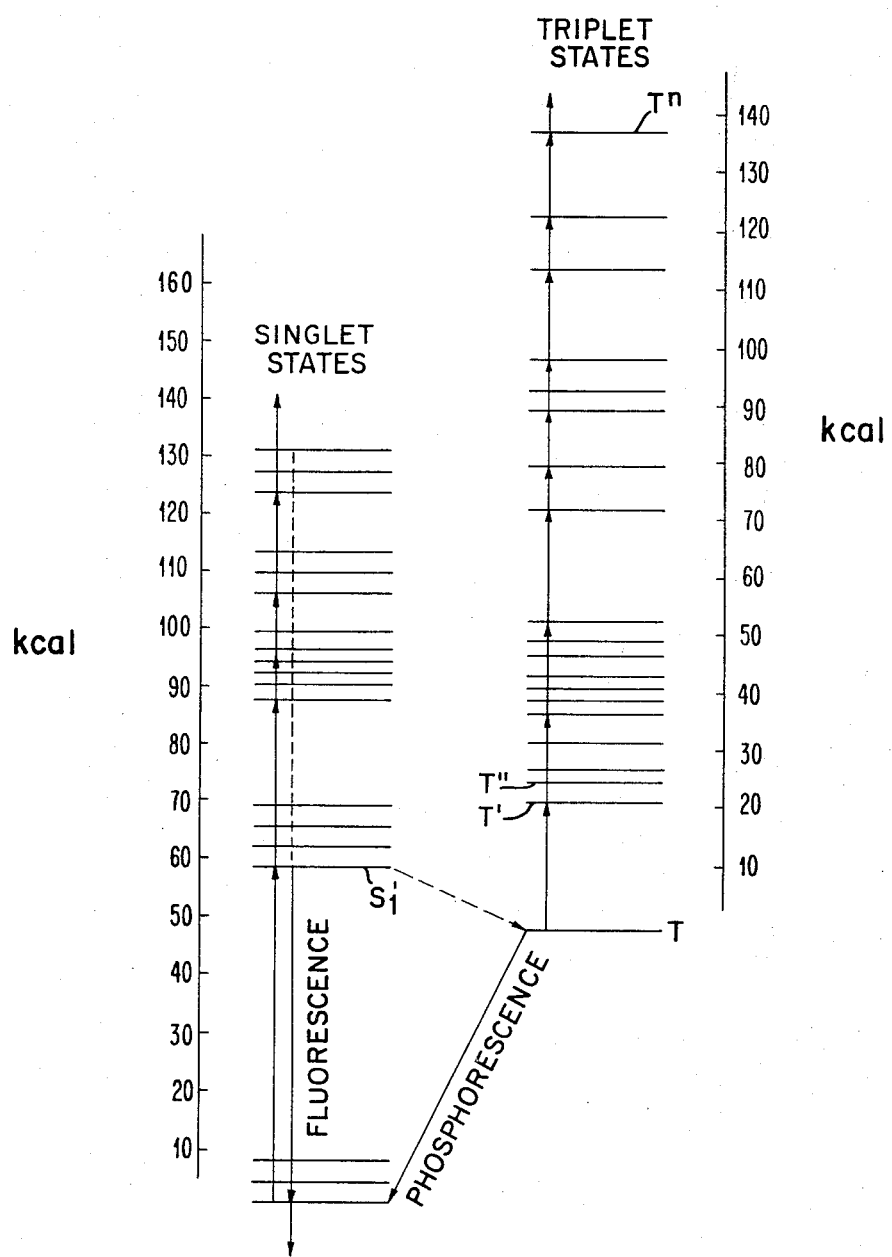

FIG. 5 shows a singlet to singlet and triplet to triplet absorption spectra of the Acridine orange cation at −183° C. and FIG. 6 is a similar plot for the fluorescein cation.

From FIGS. 5 and 6 we roughly estimate that the absolute magnitude of the loss due to triplet-triplet absorptive transitions would be about one-tenth that of the gain due to singlet-singlet fluorescent transitions, at the frequency corresponding to the fluorescence peak, were there equal populations in the lowest triplet and first excited singlet states. It is noted that the fluorescence peak occurs ~1000 cm.⁻¹ to the long-wavelength side of the singlet-singlet absorption peak. We also note that the spectra in FIGS. 5 and 6 represent data taken at −183° C.; the room temperature spectra would be considerably broader and would produce more overlap.

For definiteness, consider a pumping flux rising linearly with time, reaching its peak in about 0.5 microsecond. Assuming that the peak lamp power corresponds to the threshold pump power P, the density $n_T$ of molecules that will have accumulated in the triplet state will be $(n_1/4)k_{S'T} \times 10^{-6}$, where $k_{S'T}$ is the decay rate for non-radiative transitions from the first excited singlet state $S'_1$ to the triplet state T. If we assume a 90-percent fluorescent quantum efficiency for the dye and neglect non-radiative transitions between first excited singlet and ground states and assume a 5 nanosecond fluorescence lifetime, we obtain a value for $k_{S'T}$ of about $2 \times 10^7$/sec. Then $n_T$ works out to be $5n_1$—and the triplet-triplet loss is half the singlet-singlet gain. A borderline lasing situation is thus implied under these conditions. Clearly, in order to avoid the necessity of a pumping flux much higher than the minimum theoretically required, the risetime of the lamp should not exceed a few tenths of a microsecond. A giant-pulse ruby laser rises in 10 nanoseconds, and that is one reason why it was able to pump infrared dye lasers.

The main conclusion here, therefore, is that a flashlamp capable of supplying light power on the order of 100 kw. (in a band typically a few thousand cm.⁻¹ wide), and capable of reaching this maximum in a few tenths of a microsecond, should be an adequate source for powering a variety of organic dye lasers on a pulsed basis.

Although all known dyes with which lasing has been achieved using the coaxial lamp described herein happen to be members of the so-called xanthene class of dyes, this fact is really quite accidental. What is important in order for the dye to lase, as the above paragraphs indicate, is (1) that the nonradiative excited singlet-to-triplet decay rate be small and (2) that the ratio of triplet-triplet to singlet-singlet transition probabilities be small also. The conditions that must be satisfied are most succinctly contained in the inequality written below which really determines whether or not a dye can be made to lase, for a given lamp risetime, $$\tau_p \ll \frac{2}{k_{S'T}} \left( \frac{\epsilon_{SS'}}{\epsilon_{TT'}} \right) \qquad (1)$$

Here $\tau_p$ is the risetime of the pumping pulse, $\epsilon_{SS'}$ and $\epsilon_{TT'}$ are molar absorptivities of the singlet-singlet and triplet-triplet transitions, respectively, at the frequency at which lasing takes place. In terms of the fluorescent quantum efficiency $\phi$ of the dye, condition (1) can be written $$\tau_p \ll \left( \frac{2\tau}{1-\phi} \right) \frac{\epsilon_{SS'}}{\epsilon_{TT'}} \qquad (2)$$

In expression (2), $\tau$ is the observed fluorescent decay time.

A priori, achieving of laser action in many dyes with the fast flashlamp described in the application herein attests to the validity of this conclusion.

The lamp, an embodiment of which is shown in FIG. 1, is particularly advantageous in that the dye that lases and is housed in a thin-walled quartz cylinder provides a means for absorbing the pressures that are developed against the thin-walled quartz tube when the discharge takes place in the annular region 10. One wants the advantage of a thin-walled cylinder 2 so that there is a minimum of pumping energy lost that is to be applied to the dye. The cross-sectional area of the discharge region 10 is kept small, of the order of 0.3 cm.$^2$, so as to keep the equivalent R–L–C circuit of the lamp near the condition of critical damping. To minimize lamp inductance, the respective diameters of the copper cylinders 18 and 18′ should be kept close to the diameter of the annular discharge region 10 as possible.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for producing coherent electromagnetic radiation comprising a resonant cavity,
    a fluorescent dye in solution from the xanthene class of dyes disposed in said cavity, and
    means for exciting said dye to produce said coherent electromagnetic radiation, said exciting means having an output energy in the visible range of about 12 to 50 joules and a risetime of the order of 0.2$\mu$ second.

2. The device of claim 1 wherein said fluorescent dye is fluorescein (sodium).

3. The device of claim 1 wherein said fluorescent dye is eosin.

4. The device of claim 1 wherein said fluorescent dye is Rhodamine 6G.

5. The device of claim 1 wherein said fluorescent dye is Acridine red.

6. The device of claim 1 wherein said fluorescent dye is Rhodamine B.

7. A device for producing coherent electromagnetic radiation comprising
    a first elongated quartz tube filled with a xanthene dye in solution and closed at both ends,
    a second elongated quartz tube surrounding said first tube so as to provide a separation region of the order of one millimeter between said quartz tubes,
    an argon and air mixture filling said region to provide a discharge region,
    a low inductance capacitor surrounding said second quartz cylinder,
    conductive elements connecting said capacitor to said discharge region,
    means for charging said capacitor to a predetermined voltage, and
    means for discharging said capacitor through said region so as to provide an output energy of between 12 to 50 joules and a fast risetime pulse of light in said region, said risetime being of the order of 0.2$\mu$ second or less.

8. A device for producing coherent electromagnetic radiation comprising a resonant cavity,
    a fluorescent dye of the xanthene class in solution disposed in said cavity,
    and a lamp for pumping said dye, said lamp having a predetermined risetime,
    such dye being selected so that the product of the ratio of the strengths of the singlet-singlet transitions to the triplet-triplet transitions times the reciprocal of the non-radiative singlet to triplet decay rate is significantly greater than said risetime.

9. A device for producing coherent electromagnetic radiation comprising a fluorescent dye of the xanthene class in solution disposed in said cavity,
    an energy source for pumping said dye, said source having a predetermined risetime,
    such dye being selected so that the product of the ratio of the strengths of the singlet-singlet transitions to the triplet-triplet transitions times the reciprocal of the non-radiative singlet to triplet rate is significantly greater than said risetime.

No references cited.

RONALD L. WIBERT, Primary Examiner

C. CLARK, Assistant Examiner

U.S. Cl. X.R.

252—301.2